Figure 1:
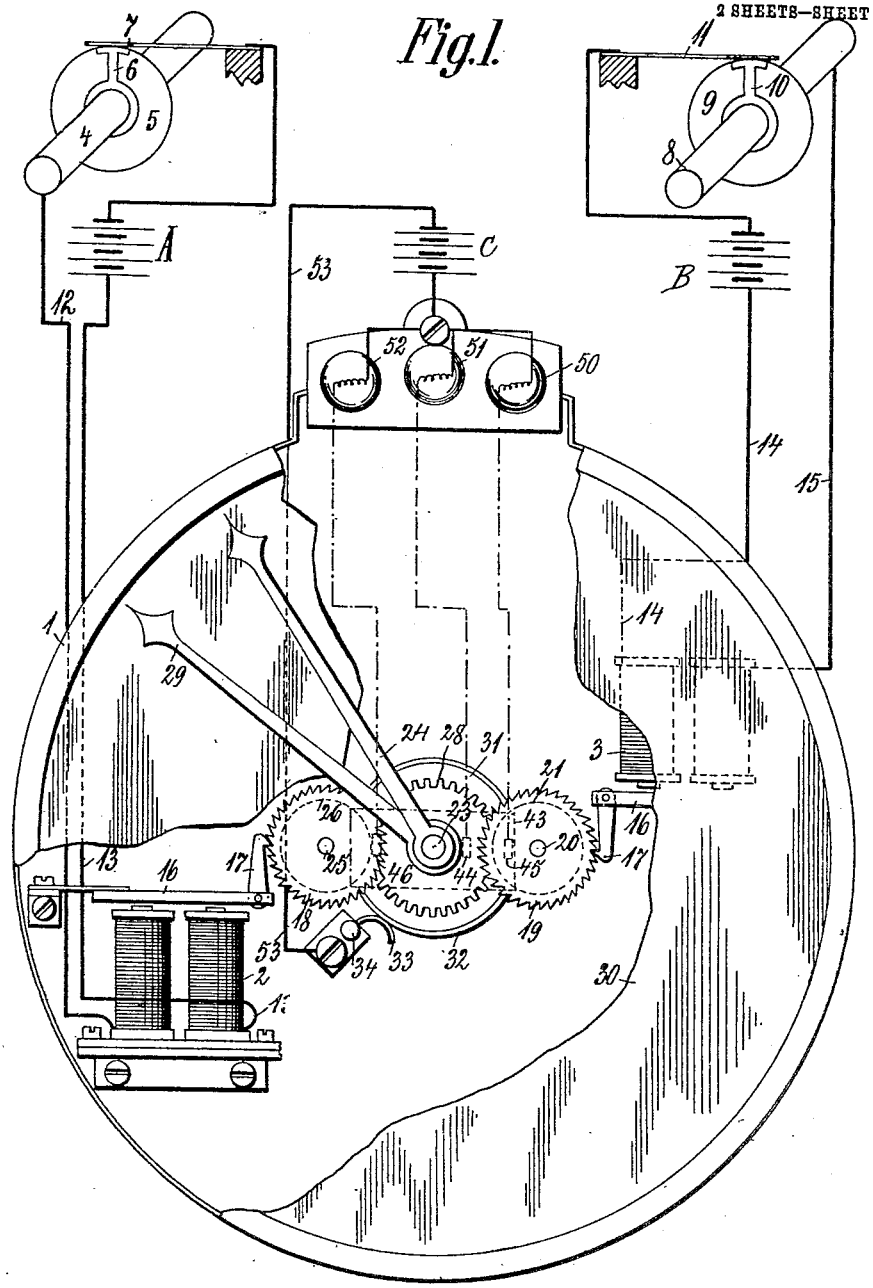

J. GREENBAUM.
CHECKING APPARATUS FOR SYNCHRONOUSLY RUNNING KINEMATOGRAPHS AND TALKING MACHINES.
APPLICATION FILED SEPT. 17, 1907.

923,511.

Patented June 1, 1909.
2 SHEETS—SHEET 1.

Witnesses:

Inventor:
Jules Greenbaum
by Hans Roemer
his Attorney.

J. GREENBAUM.
CHECKING APPARATUS FOR SYNCHRONOUSLY RUNNING KINEMATOGRAPHS
AND TALKING MACHINES.
APPLICATION FILED SEPT. 17, 1907.
923,511.
Patented June 1, 1909.
2 SHEETS—SHEET 2.
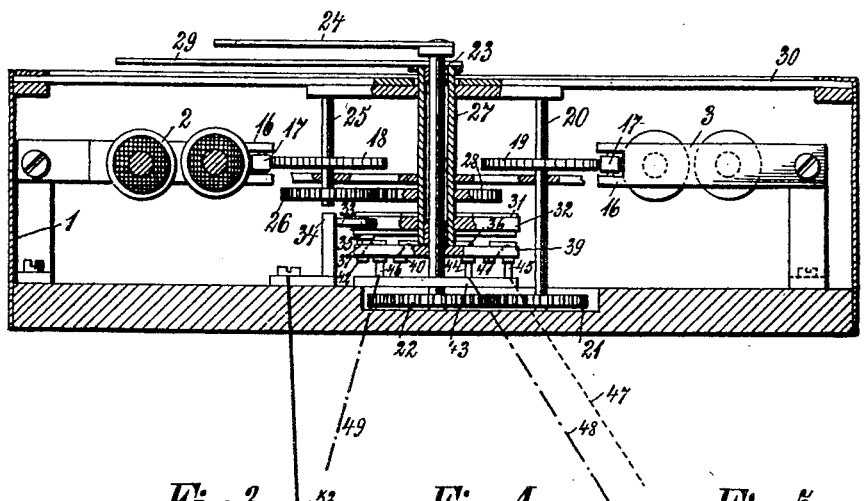
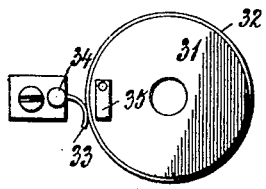
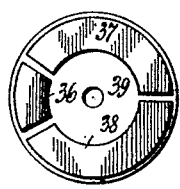
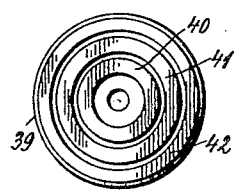
Witnesses:
Inventor:
Jules Greenbaum
by his Attorney.

UNITED STATES PATENT OFFICE.

JULES GREENBAUM, OF BERLIN, GERMANY.

CHECKING APPARATUS FOR SYNCHRONOUSLY-RUNNING KINEMATOGRAPHS AND TALKING-MACHINES.

No. 923,511.      Specification of Letters Patent.      Patented June 1, 1909.

Application filed September 17, 1907. Serial No. 393,354.

*To all whom it may concern:*

Be it known that I, JULES GREENBAUM, a citizen of the United States of America, and resident of the city of Berlin, Germany, have invented certain new and useful Improvements in Checking Apparatus for Synchronously-Running Kinematographs and Talking-Machines, of which the following is a specification.

The present invention relates to a combination of kinematographs and talking machines, the arrangement being such that while a living picture is being exhibited the necessary verbal explanations to the particular scene are simultaneously given by a talking machine.

The subject matter of this invention consists in a device which is intended to supervise and check the operation of the two apparatuses (kinematograph and talking machine); its functions are as it were, to govern the synchronism of the kinematograph and the talking machine, or to regulate the working of the two apparatuses so as to make the living picture being reproduced correspond to the explanatory remarks.

The invention consists in two rotating pointers similar to the hands of a clock so arranged that one of them is turned by the talking machine and the other by the kinematograph, the arrangement being such that when motion of the hands is uniform the two apparatuses are working synchronously, and when the hands travel at different speeds the apparatuses are not working properly. Electric incandescent lamps also, preferably lamps of different colors, are provided, one of which burns when the two apparatuses are working synchronously, while another commences to glow and the first is extinguished if the kinematograph runs too fast, and still another commences glowing while the second lamp goes out, if the talking machine runs faster than the kinematograph.

A design embodying the subject of the invention is shown in the accompanying drawings.

Figure 1 represents a front view of the regulating apparatus in connection with the main shafts of the kinematograph and the talking machine, the shafts being shown diagrammatically. Fig. 2 shows principally a vertical section of the apparatus, while Figs. 3, 4 and 5 represent various disks belonging to the apparatus carrying electric contacts.

Similar characters refer to similar parts throughout the several views.

The apparatus consists of a case 1 in which two electro-magnets 2 and 3 are fixed, these magnets being arranged to be excited by the kinematograph and talking machine respectively. The shaft 4 of the kinematograph for example carries a disk 5 with an electric contact 6 which at certain times on the shaft 4 being turned establishes an electrical connection between the sliding brush 7 and the shaft 4. The shaft 8 of the talking machine is also equipped with a contact disk 9, 10 with brush 11. The contact disks of the two apparatuses can be made in manner greatly different from the design shown in the drawing without departing from the scope of the invention. In particular the arrangements of the apparatus are not necessarily restricted to establishing a circuit once per revolution but arrangements can be made to make a circuit several times during one revolution of the shaft.

The current caused to flow by the kinematograph is derived from the current source A and flows through the conductors 12, 13, while that caused to flow by the talking machine comes from the current source B and flows through the conductors 14, 15. The armatures 16 of the electromagnets 2 and 3 have pawls 17 on their loose ends which engage ratchet wheels 18 and 19. On the shaft 20 of the ratchet wheel 19 there is a cog-wheel 21 which turns another cog-wheel on the center shaft 23 having a pointer 24 at its front end. The gear wheel 18 and the cog-wheel 26 are both on the same shaft 25, and the cog-wheel 26 engages another cog-wheel 28 which latter is on a tubular shaft 27. The tubular shaft 27 embraces the center shaft 23 and carries a pointer 29. 30 is a dial which is preferably graduated. The pointers 24 and 29 can be afforded a protection against disturbances from without in the shape of a glass pane (not shown in the drawing) covering the pointers.

Besides the pointer 29 the tubular shaft 27 also carries a disk 31 (see Fig. 3) made of insulating material on the periphery of which a metal hoop 32 is fixed. A brush 33 attached to the bracket 34 slides on the hoop 32. The disk 31 carries on its lower surface a contact spring 35 which brushes against the differently-sized segments 36, 37, 38 of a contact disk 39, the latter being fixed on the shaft 23.

The upper face of the disk 39 is shown separately in Fig. 4, the lower face being clearly shown in Fig. 5. The lower face of the contact disk 39 has a number of contact rings 40, 41, 42, attached to it, the ring 40 being in electrical connection with 36, 41 with 38, and 42 with 37. These rings 40, 41, 42 are clearly shown in Fig. 5, whereas in Fig. 2 they are shown as a series of separate contacts for the sake of clearness. Beneath the disk 39 there is a plate 43 of insulating material on which three contact springs 44, 45, 46 are fixed and these brush against the rings 40, 41, 42 of the plate 39. The contact springs 44, 45, 46 are electrically connected by the conductors 47, 48, 49, with incandescent lamps 50, 51, 52 the circuits through the lamps being continued to one pole of the current source C. The other pole of this current source is connected to the spring contact bracket 34 by the conductor 53. The current source C could, if desired, be dispensed with, and the lamps could be made to derive their current from one of the current sources A, B. By intercalating suitable switching or interrupter gear one single source of current could be made to suffice for the operation of the apparatus.

The manner in which the apparatus being described works is as follows:—When the shaft of the kinematograph and that of the talking machine turn, the electro-magnets 2 and 3 are caused to be momentarily excited once during each revolution and the wheels 18 and 19 turned one tooth farther around by the pawls 17. Consequently, when the machines are in operation, the pointers 24 and 29 will be jerked around step by step in the direction of the hands of a clock by means of the transmission gear composed of the wheels 21, 22 and 26, 28. If the relative motion of the kinematograph (shaft 4) as compared with the motion of the mechanically-driven talking machine (shaft 8) is too slow, the pointer 29 will lag behind the pointer 24; if, on the other hand, the kinematograph is running too fast, the pointer 24 will have an angle of lead. If the two pointers keep exact pace with and cover each other, this is a sign that both machines are working perfectly synchronously. In order to be able to ascertain by the position of the pointers whether the two machines are keeping pace with each other, illumination of the dial is necessary, but this can be dispensed with by making use of the lamps 50, 51, 52. As has already been explained the current needed for the lamp flows from the current source C through conductor 53 and the spring contact bracket 34 to the contact spring 33 which brushes against a metal hoop 32 on the contact disk 31. The metal hoop 32 is connected to a spring contact 35 which brushes against the different-sized segments 36, 37, 38. These segments correspond to lamps 50, 51, 52, the middle one of which for instance, can be made white, the left one blue and the right red. The arrangement of the contact disk 39 is such that on the contact spring 35 making contact with the segment 36 which corresponds to the white lamp, the white lamp will burn. Now if, while the machines are working, the one pointer 24 exactly covers the other 29, or in other words, if the two shafts 23 and 27, carrying the two pointers are running with equal speed, the white lamp 51 will be alight and will, of course, keep on burning as long as the spring 35 rests on the segment 36. The path of the current flowing through the lamp 51 is as follows:—current source C, through 53 to the bracket 34, through the spring 33, and thence to the ring 32, spring 35, segment 36, through the ring 40 to the contact spring 44, and through the conductor 48 to lamp 51 back to the current source C. If the kinematograph lags behind that disk 31 also will fall behind and the contact spring 35 will make contact with the segment 38 so that the white lamp 51 will go out and the blue lamp 52 will light up. The attendant working the kinematograph will notice this and will turn the apparatus faster. If the kinematograph runs too fast the spring 35 will move on to the segment 37 thus causing the red lamp 50 to light. The current path is similar to that traced through the white lamp excepting that the current flows from the spring 35 through segment 37 to the ring 42 and to the contact spring 45, whence it returns through the conductor 47 and the lamp 50 to the current source C. The attendant operating the apparatus is therefore always immediately apprised, on the extinguishing of the white lamp, of the machines running too fast or too slow, by the lighting of the blue or the red lamp. In order to make the deviation necessary between the two pointers to bring about the extinguishing of the white lamp as small as possible, the segment 36 will have to be made proportionately small. In the accompanying drawing the segment is represented comparatively large for the sake of clearness.

The apparatus described above may be used while taking living pictures as well as while reproducing them.

What I claim as my invention and desire to secure by United States Letters Patent is—

1. In apparatus for synchronizing a talking machine and a kinematograph, the combination with the same, of means comprising pointers arranged like the hands of a clock for indicating to the attendant when the two machines are working synchronously, a source of current, and a plurality of electric lamps connected with the latter and controlled by said means, for the purpose specified.

2. In combination, in a synchronizing apparatus, two shafts, pointers and cog-wheels on the same, electromagnets; pawls, ratchet-wheels and cog-wheels operated by said electromagnets and acting on the shafts of the pointers, contact devices on the shafts of said pointers, electric incandescent lamps, a source of current, and conductors connecting the contact devices with the incandescent lamps and said source of current.

3. In combination, in a synchronizing apparatus, two shafts, pointers on the same, electromagnets, means for transmitting motion connecting the latter with the shafts of these pointers, electric conductors connecting said electromagnets with the talking machine and the kinematograph, contact devices on the shafts of the pointers, three electric incandescent lamps, the contact devices being so arranged and connected with the incandescent lamps that when the pointers rotate in superimposed relation the circuit of the first lamp is closed and this lamp burns, whereas when the one pointer leads or lags with respect to the other, the circuit of the first lamp is opened, and the circuit of the second or third lamp is closed.

4. In combination in a synchronizing apparatus, two shafts, pointers on the same, electromagnets, means for transmitting motion connecting the latter with the shafts of these pointers, three electric incandescent lamps, a contact disk on the shaft of the one pointer and a contact disk on the shaft of the other pointer, a fixed rubbing contact for conducting current to the first contact disk, a rotating rubbing contact at the lower surface of the first contact disk, in connection with the fixed rubbing contact which leads to a source of current; three segments on the upper surface of the second contact disk electrically connected with the three contact rings on the lower surface of the second contact disk, the rubbing contact on the lower surface of the first contact disk sliding on the segments on the upper surface of the second contact disk; and three fixed rubbing contacts sliding on the three contact rings on the lower surface of the second contact disk and each leading to one of the three incandescent lamps.

5. In combination in a synchronizing apparatus two shafts, pointers on the same, electromagnets, means for transmitting motion connecting the latter with the shafts of the pointers, contact devices on the shafts of the pointers, electric incandescent lamps of which each is of a special color, electrical conductors connecting said contact devices with said lamps.

6. A synchronizing apparatus, comprising two shafts, pointers on the same arranged like the hands of a clock, cog wheels on the shafts of the pointers, electromagnets having movable armatures, means for transmitting motion operated by said electromagnets and acting on said wheels, contact devices on the shafts of the pointers, electric incandescent lamps, electrical conductors connecting said contact devices with said lamps and a casing inclosing the said elements with the exception of the two pointers and the incandescent lamps.

In witness whereof I have hereunto signed my name this 3rd day of September 1907, in the presence of two subscribing witnesses.

JULES GREENBAUM.

Witnesses:
WOLDEMAR HAUPT,
HENRY HASPER.